United States Patent [19]

Hinger

[11] Patent Number: 4,468,256
[45] Date of Patent: Aug. 28, 1984

[54] PROCESS FOR THE HYDROLYSIS OF CELLULOSE FROM VEGETABLE RAW MATERIALS TO GLUCOSE AND APPARATUS FOR PERFORMING THE PROCESS

[75] Inventor: Klaus-Jürgen Hinger, Stuttgart, Fed. Rep. of Germany

[73] Assignee: Werner & Pfleiderer, Stuttgart, Fed. Rep. of Germany

[21] Appl. No.: 331,019

[22] Filed: Dec. 15, 1981

[30] Foreign Application Priority Data

Dec. 23, 1980 [DE] Fed. Rep. of Germany ....... 3048802

[51] Int. Cl.³ .............................................. C13K 1/06
[52] U.S. Cl. ......................................... 127/1; 127/37; 422/162; 422/233
[58] Field of Search ........................ 127/1, 28, 37, 7; 366/83, 85, 88; 162/243; 422/233, 162

[56] References Cited

U.S. PATENT DOCUMENTS

| | | | |
|---|---|---|---|
| 3,070,156 | 12/1962 | Starrett | 162/243 |
| 3,814,662 | 6/1974 | Starrett | 162/243 |
| 4,023,982 | 5/1977 | Krauth | 127/1 |
| 4,316,748 | 2/1982 | Rugg et al. | 127/28 X |

FOREIGN PATENT DOCUMENTS 2552449 5/1977 Fed. Rep. of Germany .......... 127/1
117554 3/1877 France ................................. 121/7

OTHER PUBLICATIONS

Grethlein, H. E., Biotechnology & Bioengineering, Vol. XX pp. 503–525, 1978.

Primary Examiner—William F. Smith
Attorney, Agent, or Firm—Laff, Whitesel, Conte & Saret

[57] ABSTRACT

A process for the hydrolysis of cellulose from vegetable raw materials to glucose, particularly using wood as the raw material, comprises conveying the raw material through a hydrolysis zone in finely comminuted form, the raw material being impregnated with dilute acid and at a sufficiently high hydrolysis temperature. The raw material impregnated with dilute acid is supplied in portions and continuously through the hydrolysis zone where it is heated to a hydrolysis temperature of above (250°) C. by means of high pressure steam. This takes place in an extremely short time accompanied by a sudden pressure rise.

Apparatus for performing this process comprises a tubular reactor having at least one straight pipe through which can be conveyed an endless piston chain. The pistons of this chain form a leakage gap opposite the inner wall of the pipe and, in each case, two adjacent pistons define a piston chamber. A high pressure steam line is arranged to issue approximately into the center of the pipe.

14 Claims, 10 Drawing Figures

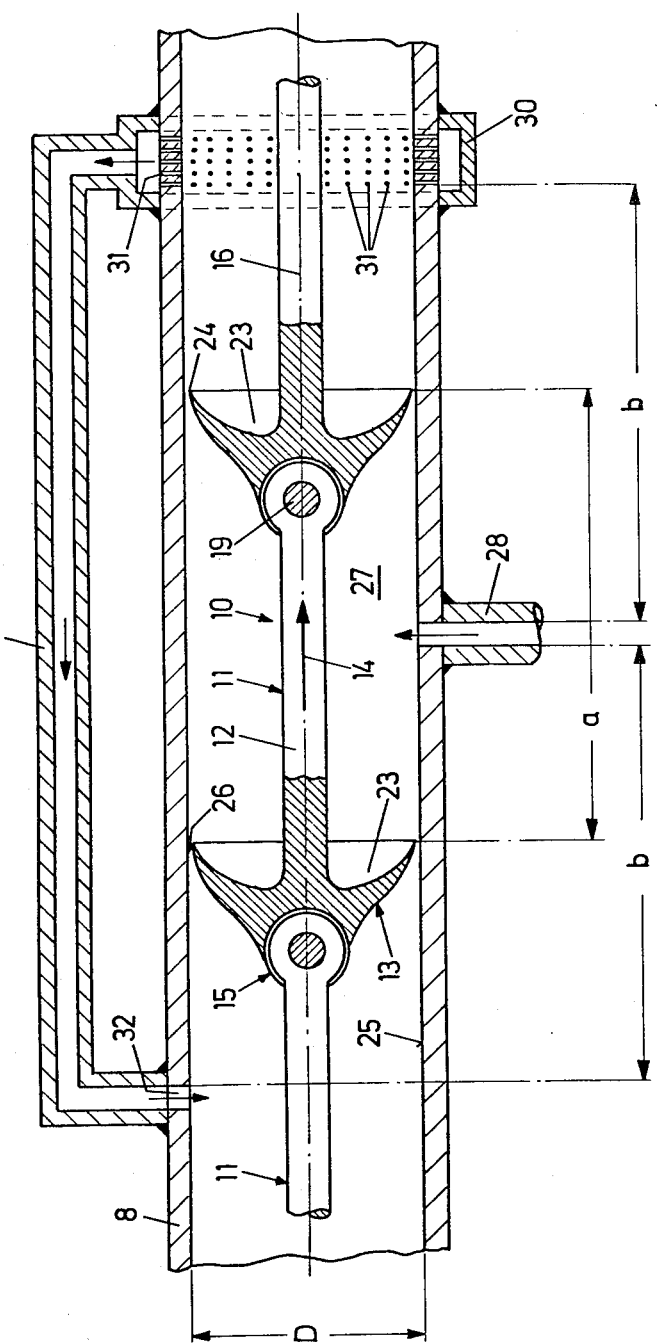

PROCESS FOR THE HYDROLYSIS OF CELLULOSE FROM VEGETABLE RAW MATERIALS TO GLUCOSE AND APPARATUS FOR PERFORMING THE PROCESS

FIELD OF THE INVENTION

This invention relates to a process for the hydrolysis of cellulose from vegetable raw materials to glucose and to an apparatus for performing this process.

BACKGROUND OF THE INVENTION

As the earth's energy supplies, particularly of petroleum and natural gas are becoming scarcer, increasing importance is being attached to the use of organic waste materials and regenerative raw materials, such as wood, straw and other agricultural products.

Therefore, work has been carried out again on processes for the saccharification of wood by hydrolysis of cellulose to glucose because from the latter ethanol can be reduced, which can be added to gasoline and diesel fuel. Such wood saccharification processes, particularly of the type described in German Pat. No. 577,850 were to a limited extent used on an industrial basis up to the end of World War II and more recently.

It is now known on the basis of theoretical research from the article by Hans E. Grethlein in the Journal "Biotechnology and Bioengineering", Vol. XX, 1978, pp. 503 to 525 "Comparison of the Economies of Acid and Enzymatic Hydrolysis of Newsprint" that a high glucose yield, based on the α-cellulose used is obtained if hydrolysis temperatures of 250° to 300° C. are raised at pressures of 40 to 90 bar and if dilute sulphuric acid with a concentration of up to 2.0% is used, accompanied by an extremely short hydrolysis time of up to 0.03 sec. However, such hydrolysis conditions have not hitherto been industrially attainable.

It is known from DAS No. 1,642,534 to comminute cellulose-containing raw materials to dust particle size and to mix them with water and dilute sulphuric acid until a pumpable mixture is obtained. By means of a suspension pump, this pumpable mixture is pumped through a pipe system with different sections. The suspension is firstly indirectly heated to hydrolysis temperature in a heat exchanger over heating surfaces. Hydrolysis then takes place in a thermally insulated reaction vessel for a period of up to 6 minutes. The hydrolyzed product is then cooled in a heat exchanger. In addition, the pressure in the system must be regulated. This known apparatus and process is not suitable for obtaining very short residence times, so that the glucose yields which can be obtained are not high. In addition, the specific energy use is very high, because all the water of the suspension must be heated to hydrolysis temperature. The suspension pump must carry out all the mechanical delivery work in the high pressure area and this is completely destroyed in the regulating valve during release. Waste heat recovery is only possible to a very limited extent.

DOS No. 2,994,789 describes a fundamentally similar process with a similar apparatus in which heating takes place by steam injection. The disadvantages described hereinbefore are substantially the same.

German Pat. Nos. 1,567,350 and 1,567,335 describe percolator fixed bed reactors for a semicontinuous hydrolysis in which dilute sulphuric acid is gradually trickled over a fixed bed of wood chips and in which cellulose is reacted to glucose with a yield of approximately 50% at a hydrolysis temperature of 120° to 145° C. and a residence time of 15 to 60 minutes. Quite apart from the relatively low glucose yield, a high specific energy use is required.

BRIEF SUMMARY OF THE INVENTION

The object of the invention is to provide a process and an apparatus of the aforementioned type in which glucose yields of 60 to 90% with a low specific energy use and a low technical expenditure are possible.

Accordingly, one aspect of the invention provides a process for the hydrolysis of cellulose from vegetable raw materials to glucose, particularly accompanied by the use of wood as the raw material, the raw material being conveyed through a hydrolysis zone in finely comminuted form, impregnated with dilute acid and at a sufficiently high hydrolysis temperature, wherein the raw material impregnated with dilute acid is supplied in portions and continuously through the hydrolysis zone where it is heated to a hydrolysis temperature of above 250° C. by means of high pressure steam, this taking place in an extremely short time accompanied by a sudden pressure rise.

Thus, it is important for the process of the invention that the heating and pressure increase of the raw material to be hydrolyzed take place in an extremely short time, so that the sought extremely short residence time is achieved as an optimum hydrolysis time. The extremely short heating times can be attained and assisted by blowing in of saturated steam into the hydrolysis process because, by this means, a good turbulence and therefore a good heat transfer is obtained. As a result of the condensation of the saturated steam, maximum heat transfer coefficients are also obtained. As a result, hydrolysis temperatures of up to 300° C. and, corresponding to the saturated steam pressure at such temperatures of approximately 90 bar, the corresponding pressures and therefore also residence times of less than 1 sec and down to 0.03 sec are possible in the hydrolysis zone.

Preferably, steam is removed behind the hydrolysis zone which makes it possible in a very simple manner to carry out a very rapid temperature and pressure drop immediately behind the hydrolysis zone, so that there is no further reaction.

In turn, these measures make it possible to minimise the specific energy use because the steam removed for reducing the temperature and pressure can again be used prior to hydrolysis for preheating the raw material to be hydrolyzed. As a result, the raw material to be hydrolyzed is exposed to approximately parabolically rising steam pressures and temperatures, is held for an extremely short time at the temperature and pressure maximum in the hydrolysis zone and is then immediately cooled again accompanied by a pressure drop.

Leakage steam may be used for preheating the material.

In a preferred form of the process according to the invention, wood chips are exposed in the moist state to steam treatment at approximately 5 to 10 bar up to complete temperature homogeneity, followed by a sudden release to atmospheric pressure.

Another aspect of the invention provides apparatus for carrying out the above-described process, which apparatus comprises a tubular reactor having at least one straight pipe, an endless piston chain adapted to be conveyed through said pipe, each piston of said chain forming a leakage gap opposite the inner wall of said pipe and in each case two adjacent pistons defining a piston chamber, and a high pressure steam line issuing approximately into the centre of said pipe.

Piston or plunger chain conveyors have long been known and have been used for raising water. It is also known to use piston chain conveyors for feeding coal into a coal gasification reactor under a pressure of 40 to 80 bar. There must be no gas leaks between the inner wall of the pipe and the piston during this supply of coal counter to the gas pressure from a reaction zone. In addition, further complicated and costly measures must be taken to minimise gas leaks behind the coal discharge zone.

The construction according to the invention permits a planned steam leakage in the feed direction and counter to the feed direction permitting both preheating and cooling. These measures place the entire piston chain under tension and lead to a pressure balance of the complete system in the pipe, so that the necessary motive energy is very low. Considerable energy savings result from these measures due to the controlled steam leaks through leakage gaps between the piston and the inner wall of the pipe.

According to a preferred embodiment, a steam removal line issues from said pipe at a distance which is greater than the length of a piston chamber and a preheating steam inlet is arranged in said pipe at approximately the same distance in front of the opening of said steam line considered in the conveying direction of said piston chain, said preheating steam inlet being connected to said steam removal line. This arrangement greatly assists the aforementioned measures, particularly with regard to energy saving.

Preferably, a plurality of removed steam return lines are provided symmetrically to the inlet to said high pressure steam line.

The feed surfaces of each piston are desirably curved in cup-shaped manner with the outer edges pointing in the conveying direction of said piston chain. By this means, each piston has a material-raising action so that high conveying friction or even jamming and wedging are prevented.

BRIEF DESCRIPTION OF THE DRAWINGS

The invention will now be further described, by way of example, with reference to the drawings, in which:

FIG. 3 is a partial cutout from FIG. 2 on a larger scale and in greater detail;

DETAILED DESCRIPTION OF THE PREFERRED EMBODIMENTS

Figure 1:
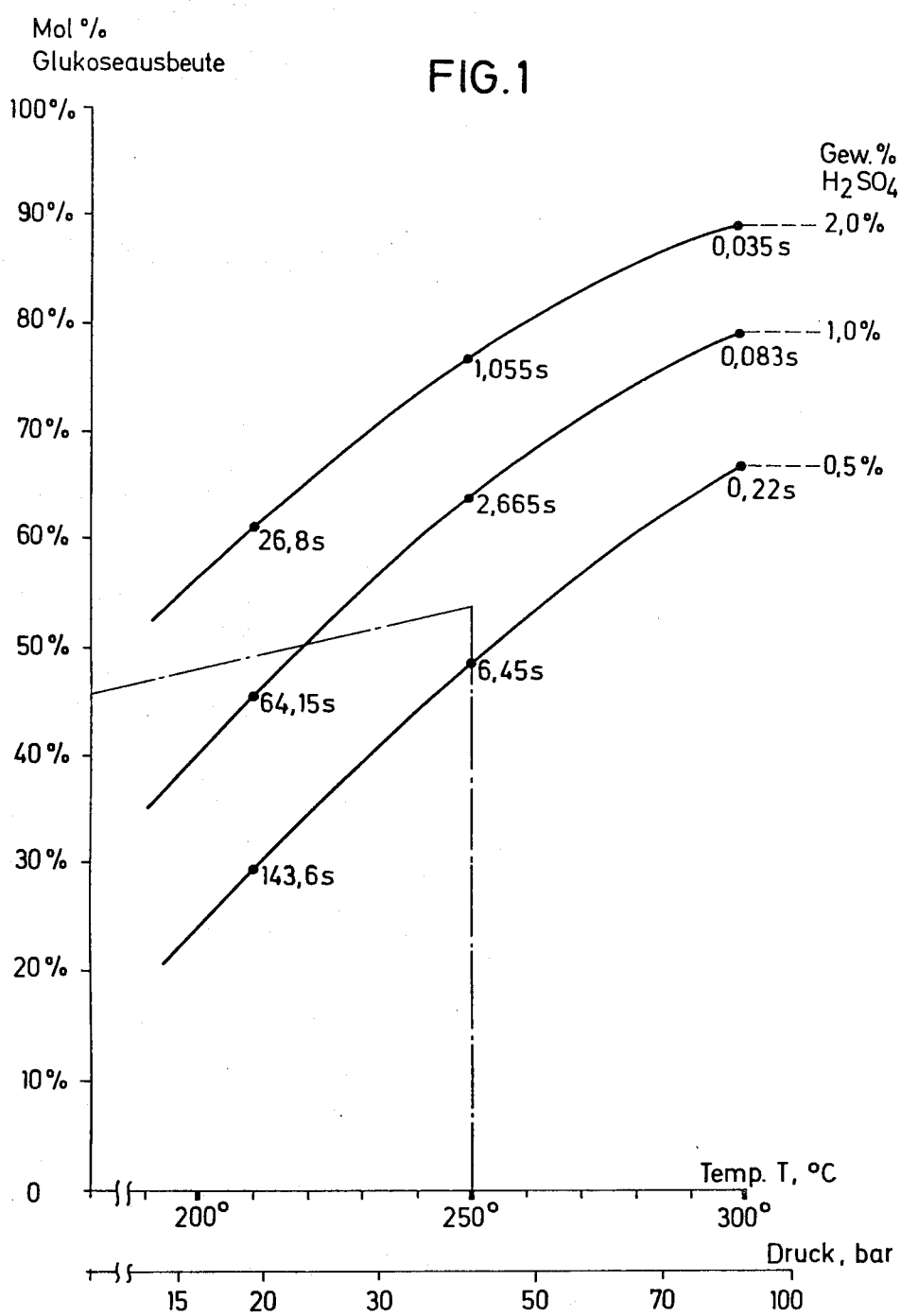
FIG. 1 shows the reaction-kinetic relationship between the yield of glucose from α-cellulose as a function of the hydrolysis temperature, pressure, acid concentration and residence time.

Before explaining the process and apparatus according to the invention, the diagram of FIG. 1 will first be explained, which has been derived from the aforementioned publication by Grethlein. It shows that the yield of glucose from α-cellulose rises with increasing hydrolysis temperature and pressure. The yield also increases with rising concentration of the dilute sulphuric acid used as the catalyst and specifically up to a concentration of 2.0% by weight $H_2SO_4$. In addition, a considerable reduction in the optimum hydrolysis time is linked with the rise in the aforementioned parameters. Whereas the area bordered by broken lines could hitherto be industrially achieved, the area in which the glucose yields are well above 50% could not be industrially achieved.

As can be gathered from the drawings, the apparatus according to the invention is a tubular reactor arranged in a substantially closed casing. This tubular reactor has sprockets 5, 6 rotatably mounted about parallel rotation axes 3, 4 and whereof at least one, namely the sprocket 6, can be driven in a rotary manner, so that both sprockets 5, 6 are rotated in the same rotation direction as indicated by the arrows 7. An upper pipe 8 and a lower pipe 9 are arranged parallel to one another approximately in the tangential plane common to the two sprockets 5, 6 and through said pipes can be drawn an endless piston or plunger chain 10 guided over the sprockets 5, 6.

This piston chain 10 comprises individual chain links 11 in each case comprising a rod 12 and a piston 13 constructed in one piece therewith. The individual chain links 11 are connected to one another in an articulated manner, a joint 15 being provided on the rear side of each piston with respect to the feed direction 14. The chain links 11 are arranged symmetrically relative to the median longitudinal axis 16 of the particular pipe 8, 9, so that the articulation is also in axis 16. Two side plates are arranged in spaced manner at the back of each piston 13 and are symmetrical to the longitudinal axis 16. Between the said side plates is arranged a lug 18 constructed on the associated free end of the rod 12 of the following chain link 11. The plate 17 and lug 18 are provided with aligned bores through which is placed a joint bolt 19 projecting on either side beyond the side plate 17. The bores are dimensioned in such a way that the joint bolt 19 is either non-rotatable relative to the side plate 17 with the lug 18 rotatable or is non-rotatable relative to the lug 18, but rotatable relative to the side plate 17.

Radially projecting cams 21 are constructed on the outer periphery 20 of the sprockets 5, 6 and on their radially outer end the cams in each case have a recess 22. In each case, two such cams 21 are arranged behind one another in the direction of rotation axes 3 or 4 and the internal spacing between the cams is somewhat larger than the spacing between the side plate 17 constructed on each piston 13. The recesses 22 are used for receiving the projecting areas of the joint bolt 19, which brings about the feed or conveying of piston chain 10. The distance between the particular recess 22 and the outer periphery 20 of each sprocket 5 or 6 is such that the pistons 13 are free from the particular outer periphery 20 of the corresponding sprocket 5, 6.

The front feed or conveying surfaces 23 of pistons 13 in the feed or conveying direction 14 are constructed in cup-shaped manner, i.e. the relatively sharp-edged or cutting edge-like outer areas 24 of pistons 13 essentially point in the conveying direction 14. Thus, the conveying surfaces 23 of the pistons 13 in the vicinity of the particular outer edge 24 have an action raising the material from the inner wall 25 of pipe 8 or 9, so that the mechanical conveying energy is gradually reduced. This also substantially prevents wedging or jamming. Furthermore, precisely defined leakage gaps 26 are formed by the outer edges 24 on the one hand and the inner wall 25 on the other.

Between, in each case, two adjacent pistons 13 a piston chamber 27 is formed, which moves in accordance with the movement of the piston chain 10 and whose length a is determined by the spacing of the outer edges 24 of the two adjacent pistons 13. Spacing a is two to three times the pipe diameter D. Approximately in the centre of the pipe 8, a high pressure steam line 28 enters into it. When considered in the conveying direction 14, a steam removal pipe 29 passes out of the pipe 8 downstream. In order to achieve a uniform steam removal, an externally steam-tight annulus 30 is placed around the pipe 8 and is connected by means of a plurality of holes 31 with the inner area of the pipe 8. A cross-section of these holes 31 is smaller than the cross-section of the smallest material grains used, so that the holes 31 act as a filter. The steam removal line 29 connected to the annulus 30 is returned counter to the the conveying direction 14 and, upstream of the inlet of the steam line 28, issues with a preheating steam inlet 32 into the pipe 9. The distance b between the inlet of the steam line 28 and the outlet of the removal line 29 is always somewhat larger than the length a of a piston chamber 27 in order to prevent a short-circuit between the steam line 28 and removal line 29. The same applies regarding the appropriately identical spacing b between the inlet of the steam line 28 and the inlet 32.

In order to achieve a release and consequently rapid cooling and uniform energy recovery by steam return in several stages, further downstream and at a distance c from the inlet of the steam line 28, a steam removal line 33 is connected to the pipe 8 which, at the distance c, upstream from the inlet of the steam line 28 at a preheating steam inlet 34 again issues into the pipe. The distance c is somewhat larger than a multiple of the length a of a piston chamber. Through arranging the steam removal lines 29 and 33 symmetrically to the supply of the high pressure steam line 28, the piston chain 10 is pressure-compensated in the conveying direction 14, which considerably reduces the torques necessary for driving the sprockets over a drive shaft 35.

In the same way, further steam removal lines can be arranged symmetrically to the inlet point of the high pressure steam line 28, although they are not shown in the drawings.

Figure 8:
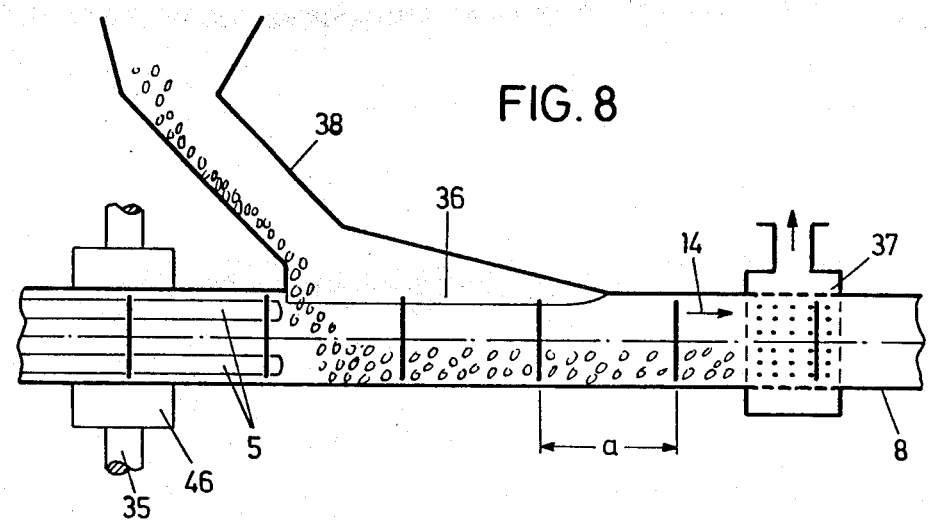
FIG. 8 is a partial cutout from FIG. 2 on a larger scale for material charging in a construction for free-flowing material.

At the beginning of the pipe 8, viewed in the conveying direction 14, a material feed port 36 is formed which, according to the detailed view of FIG. 8, extends over the length of several piston chambers 27 for bringing about an optimum uniform material charging in the longitudinal direction of the pipe 8. Downstream of the feed port 36 is provided an exhaust steam opening 37, which can be constructed the same or similar to the outlet of the removal line 29. The leakage steam is completely removed here, so that no further steam flows counter to the free-flowing material flowing through feed port 36, i.e. it is fed into a pressureless area. Naturally, the distance between the opening 37 and feed port 36 is at least somewhat larger than the length a in order to prevent a steam short-circuit. In the construction of FIG. 8 for the feeding in of free-flowing material, a filling pipe 38 constructed in the form of a chute is positioned upstream of the material feed port 36.

Figure 9:
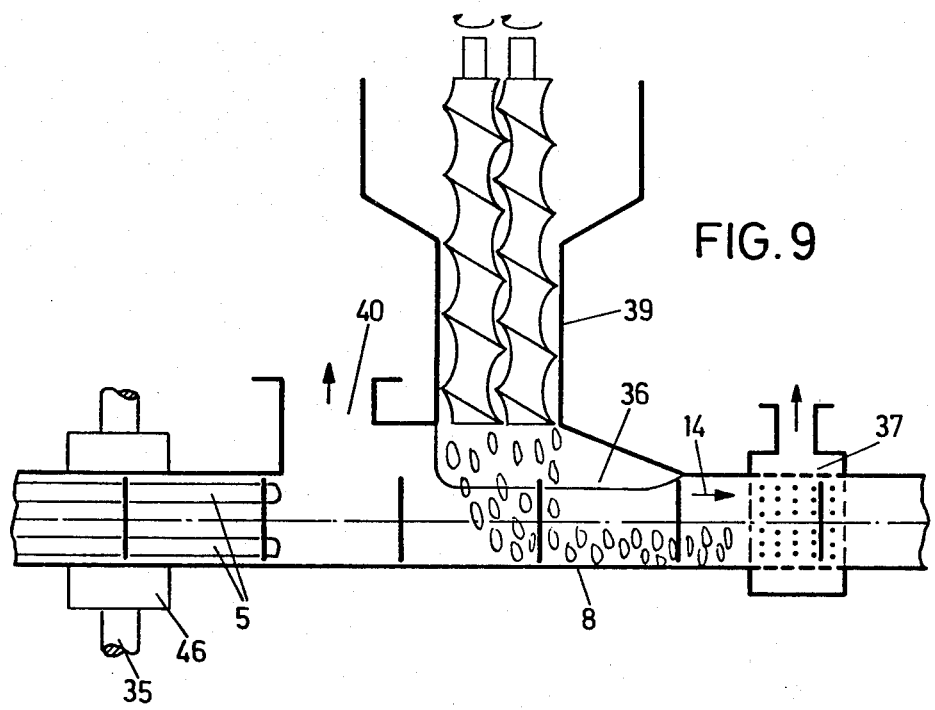
FIG. 9 shows a material charging variant for material which is not free-flowing.

FIG. 9 is an alternative for feeding in non-free-flowing material, such as e.g. shavings. The material is fed into the pipe 8 by means of a uniformly driven twin-screw serving as a tamping and proportioning screw 39. Leakage steam, which has been removed by the exhaust system opening 37 and which may penetrate the area of the feed port 36 is then removed by an additional leakage steam opening 40.

At the rear end of the pipe 8, viewed in the conveying direction 14, is provided a material discharge port 41 on said pipe and it is positioned immediately in front of the associated sprocket 6. A hopper 42 leads from the port 41 to a steam-liquid separator 43. The material to be discharged is sprayed and washed from the piston chain 10 by means of a glucose extraction liquid by means of numerous high pressure nozzles 44 arranged in front of the discharge port 41. Simultaneously, the leakage steam flow passing up to the discharge port 41 is used as a transport medium for discharging material from the hopper 42. The material and steam are then separated in the separator 43. Above the sprockets 5, 6 are arranged covers 45, whose cross-section approximately corresponds to the pipes 8, 9, so that even if the piston chain 10 breaks, there is a firm guidance on the sprockets 5, 6, i.e. the chain links 11 cannot fly out from the corresponding pipe 8 or 9 in an explosive manner. Sealing and bearing housings 46 for the shafts of the sprockets 5, 6 and, in particular, the drive shaft 35 are fitted to the said covers 45.

Figure 2:
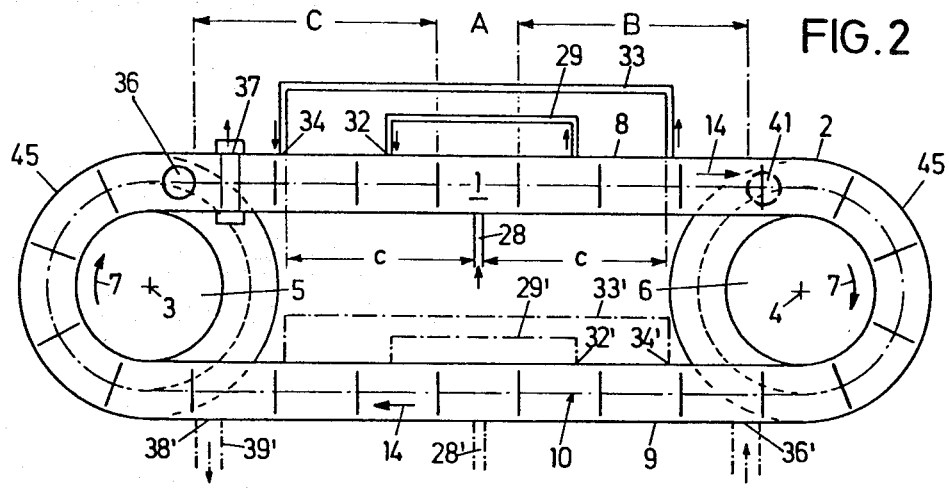
FIG. 2 is diagrammatic view of an apparatus according to the invention.

The lower pipe 9 in FIG. 2 can be constructed in the same way as the upper pipe 8. The corresponding parts are merely shown in broken line form and the reference numerals are followed by an apostrophe. Thus, there is no need to describe the construction again.

Figure 10:
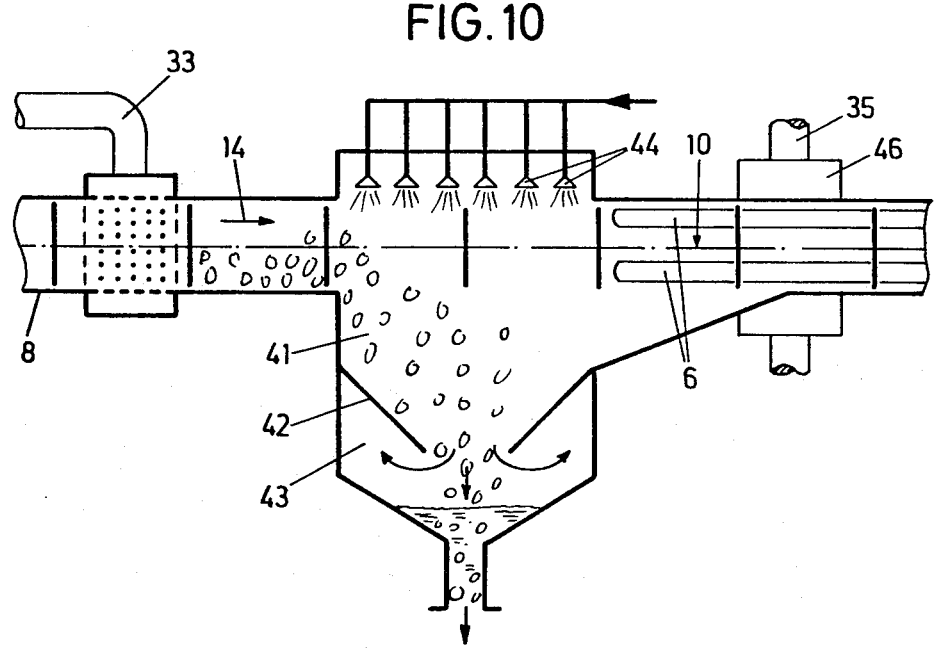
FIG. 10 is a larger scale partial cutout from FIG. 2 relating to the material discharge.

For constructional reasons, the two pipes 8, 9 are generally arranged in a common horizontal plane, so that the rotation axes 3, 4 of the sprockets 5, 6 are vertical, as shown in FIGS. 8 to 10. The term upper pipe 8 and lower pipe 9 is therefore only to be understood in connection with FIG. 2.

The subsequently described hydrolysis process is formed in the tubular reactor. The cellulose-containing material fed to the feed port 36 in FIGS. 8 and 9 is previously pretreated in the following way. The raw material, e.g. wood is firstly comminuted to a particle size of max. 10 mm, but preferably the particle sizes extend to below 1 mm.

This comminuted raw material is then impregnated in dilute sulphuric acid with a proportion of B 0.5 to 2.0% by weight of $H_2SO_4$. Impregnation preferably takes place under vacuum, so that the air enclosed in the raw material can escape. Owing to the acid impregnation, $H_2SO_4$ as the catalyst is homogeneously distributed in the cellulose to be broken down.

All the excess water is then separated in a centrifuge or straining press in order to keep the moisture content of the material to be used as low as possible, due to the resulting savings of heating steam.

The thus dehydrated and already impregnated raw material is now heated by means of exhaust steam at 100° C. and a saturated steam pressure of 1 bar from ambient temperature to approximately 100° C., for which purpose exhaust steam drawn from the tubular reactor is used.

The thus pretreated raw material can be prehydrolyzed at the aforementioned temperature of 100° C. and a residence time of several hours, so that valuable products such as xylose, glucose, methanol, furfural, etc. can be obtained from the heavy cellulose. The α-cellulose fraction remains unchanged in the case of such a preliminary hydrolyzation. This pretreatment of the raw material is known from DOS Nos. 1,642,534; 2,647,910 and 2,827,388. The thus prehydrolyzed or not prehydrolyzed raw material is then fed in the dehydrated state via the feed port 36 into the tubular reactor 1.

Figure 6:
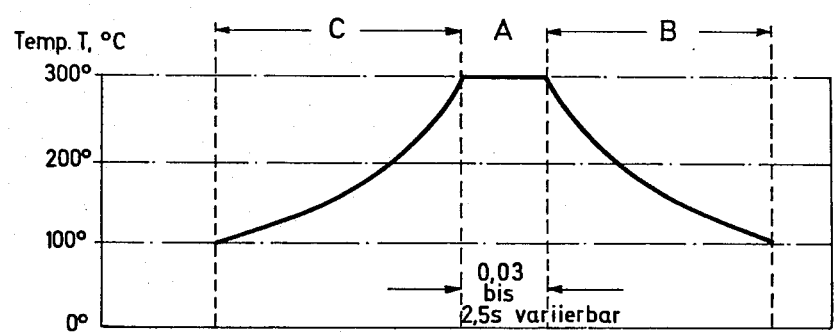
FIG. 6 shows the temperature gradient over the conveying path of the material to be hydrolyzed in the apparatus of FIG. 2.
Figure 7:
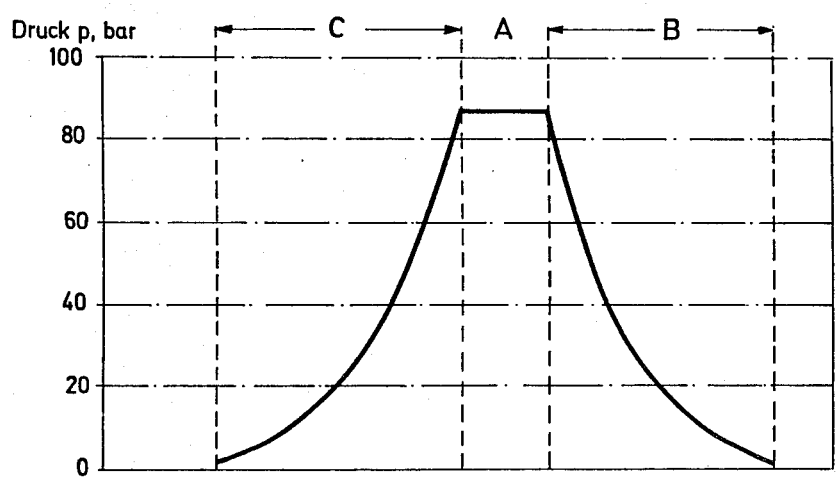
FIG. 7 shows the hydrolysis temperature gradient over the feed path.
Figure 4:
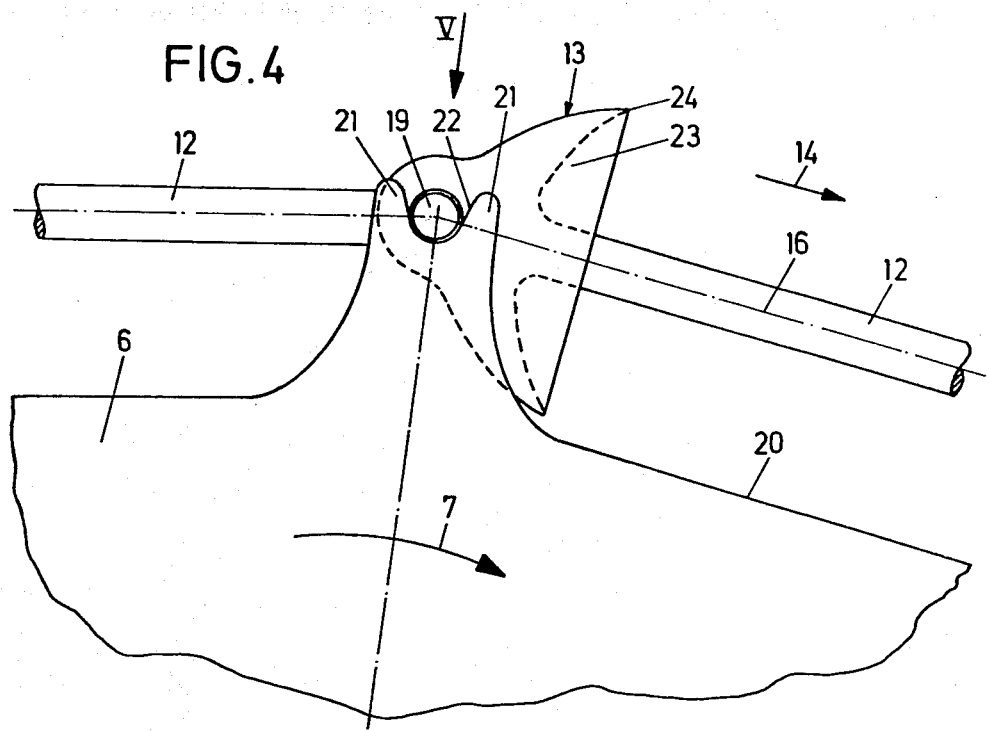
FIG. 4 is another partial cutout from FIG. 2 on a larger scale and in greater detail.
Figure 5:
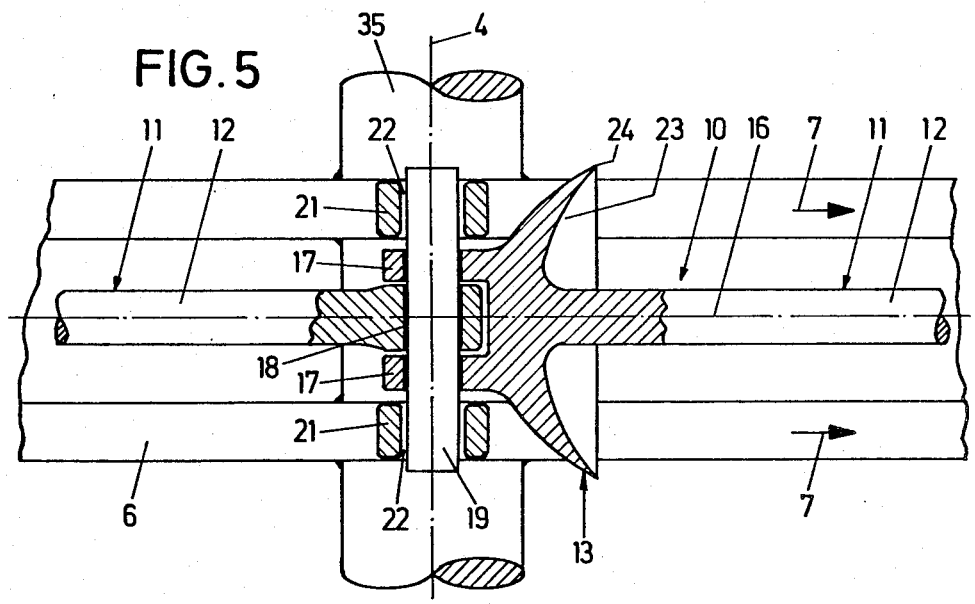
FIG. 5 is a plan view, partially in section, of the partial cutout taken in the direction of the arrow V in FIG. 4.

One piston chamber 27, which covers the inlet to the high pressure steam line 28 defines the hydrolysis zone A into which is blown high pressure saturated steam with a temperature of approximately 300° C. and a pressure of approximately 90 bar (cf FIGS. 6 and 7), while simultaneously subjecting the materials in said one piston chamber 27 to intense turbulence. In accordance with the double length a of the piston chamber 27 and the speed of the piston chain 10, a residence time of the material in a hydrolysis zone A is obtained, which is below 2.5 seconds and is preferably 0.03 to 0.1 seconds (cf FIG. 1). Thus, saturated steam and not superheated steam is used, because the latter was largely condensed on flowing into the hydrolysis zone, so that the maximum possible heat transfer coefficients to the individual material particles are produced. Considered in the conveying direction 14, the hydrolysis zone A is followed by a release zone B because immediately on leaving the zone A the aforementioned piston chamber 27 covers the steam removal line 29, so that the steam located in said chamber can at least in part flow out and is conveyed upstream when it is introduced as preheating steam into the pipe 8 in a heating-up zone C extending from the feed port 36 or exhaust steam opening 37 to the hydrolysis zone A. The same occurs on a lower pressure and temperature level at the outlet from the steam removal line 33. Leakage steam flows flow through the leakage gaps 26 between the outer edges 24 of piston 13 and the associated inner wall 25 of the pipe 8. The pressure ratio in two adjacent piston chambers 27 is in each case approximately 2. As a result, considered in the conveying direction 14, there is a parabolic rise of temperature T in the heating-up zone from 100° to 300° C. and a parabolic rise of the pressure p from 1 bar to approximately 90 bar. The pressure and temperature drop in the release zone B is approximately mirror symmetrical thereto.

On using the maximum number of removal lines for steam return and on making the leakage gaps 26 very small, only a very small part of the steam flows to the exhaust steam opening 37, so that the need for high pressure steam is reduced. Steam still escaping from the discharge port 41 is used for preheating the raw material from ambient temperature to 100° C.

In the case of complete steam recycling, a live steam requirement of 0.17 kg/kg of moist material or 0.47 kg/kg of dry material can be achieved with an initial moisture content of 50%. Thus, steam economies result both from the return of the expanded steam and through the material to be hydrolyzed having a low initial moisture content.

As the piston chain 10 is pressure-compensated in the entire reaction zone comprising the heating zone C, hydrolysis zone A and release zone B, the necessary mechanical driving forces are relatively low. The driving energy to be applied is approximately 0.01 kWh/kg of material, whereas in the known processes 0.1 to 0.2 kWh/g of material is required.

Owing to the very high pressure relief immediately at the end of the hydrolysis zone, there is also a sudden cooling of the material, so that a further reaction can occur. The high chain speeds of 0.3 to 1.5 m/s and preferably approximately 1 m/s make it possible for the pipe 8 to have a relatively small diameter. For a throughput capacity of 10 t/h of dry wood, the piston diameter is approximately 160 mm, the piston chamber length 320 mm and the pipe length approximately 4 m. As the width of the leakage gap 26 is about 1 to 2 mm or even higher, inexpensive manufacture of the piston 13 is possible.

During revolution, only the chain links 11 are exposed to variable temperatures. In the pipe 8, a substantially stationary temperature profile is formed, so that in the vicinity of its inner wall 25 it can be provided e.g. with an acid-proof lining made from ceramic or stone because owing to the gaps 26 and the tension of the piston chain 10 due to the steam pressure profile, there is only very limited friction between the piston 13 and the inner wall 25 or lining.

In place of a second reaction zone, the lower pipe 9 can also be used for carrying out a further preparatory process, namely the forcing open of wood chips for the better internal decomposition for the following hydrolysis in the upper pipe 8. Over the entire length of the reactor, moist wood chips are exposed to the action of high pressure saturated steam of approximately 10 bar up to complete temperature homogeneity, i.e. up to uniform heating. The pressure, temperature and desired residence time must be such that no significant hydrolysis reaction occurs. If there is then a sudden pressure release at the discharge point to 1 bar, i.e. atmospheric pressure, the wood structure is pulled apart to such an extent that during the following, previously described hydrolysis reaction in the upper pipe 8, the high pressure steam has much easier and faster access to the cellulose. However, this process requires additional steam. It is therefore preferable to use the raw material with a relatively smaller particle size, obtained by grinding.

At the end of the release zone B, the hydrolyzed material is discharged through the discharge port 41. The glucose formed is extracted from the material by means of slightly alkaline, hot wash water, as is known e.g. from DOS No. 2,744,067. The extraction liquid can also be used for spraying clean the piston chambers 27.

What is claimed is:

1. A process for preparing glucose by the hydrolysis of cellulose from vegetable raw materials, said raw material being in a finely comminuted form and impregnated with dilute acid, comprising providing a plurality of movable chambers, supplying the raw material to more than one of the chambers so that the raw material is supplied in small separate portions, providing an enclosed hydrolysis zone, supplying high pressure steam to the hydrolysis zone to heat the hydrolysis zone to a temperature of above 250° C., conveying the raw material in one of the chambers into and out of the hydrolysis zone so that said raw material is in contact with the high pressure steam in said hydrolysis zone for less than 2.5 seconds.

2. A process according to claim 1, wherein the saturated steam acts on the raw material for 0.03 to 0.1 sec.

3. The process according to claim 1 wherein the saturated steam acts on the raw material for 0.03 to 0.1 sec.

4. A process according to claim 1, wherein saturated steam is blown into the hydrolysis zone.

5. A process according to claim 1, wherein steam is removed from the chamber after the raw material in the chamber is out of the hydrolysis zone to cause a very rapid temperature and pressure drop in the chamber.

6. A process according to claim 5, comprising supplying the removed steam to the raw material in the chamber prior to the chamber and raw material entering the hydrolysis zone.

7. A process according to claim 1, comprising providing a steam leakage passage between adjacent chambers.

8. A process according to claim 1, wherein the raw material is wood chips, and the steam treating the wood chips in the hydrolysis zone is at approximately 5 to 10 bar up to complete temperature homogeneity and immediately releasing the pressure at atmospheric pressure after the raw material in the chamber leaves the hydrolysis zone.

9. A process according to claim 8 wherein the amount of raw material in the chamber is predetermined to permit turbulance of the raw material in the chamber while it is being hydrolized.

10. In an apparatus for preparing glucose by the hydrolysis of cellulose from vegetable raw materials, said raw material being finely comminuted from and impregnated with dilute acid, a tubular reactor comprising at least one straight pipe, an endless piston chain adapted to be conveyed through said pipe, said piston chain having a plurality of pistons spaced a predetermined distance apart, each piston of said chain forming a leakage gap opposite the inner wall of said pipe, two adjacent pistons defining a chamber a hydrolysis zone formed by said straight pipe, a high pressure steam line issuing approximately into the center of said pipe and into said hydrolysis zone, means to drive said piston chain at a predetermined speed wherein the spaced pistons are moved through the hydrolysis zone straight pipe such that the residence time of the material in the hydrolysis zone is less than 2.5 seconds.

11. The apparatus of claim 10 wherein the piston drive means drives the chain at such a speed that when the length of two piston chambers is divided by the speed of the chain it is less than 2.5 seconds.

12. An apparatus according to claim 11, wherein a plurality of removed steam return lines are provided symmetrically to the inlet to said high pressure steam line.

13. An apparatus according to claim 10, wherein a steam removal line issues from said pipe at a distance which is greater than the length of a piston chamber and a preheating steam inlet is arranged in said pipe at approximately the same distance in front of the opening of said steam line considered in the conveying direction of said piston chain, said preheating steam inlet being connected to said steam removal line.

14. An apparatus according to claim 10, wherein the feed surfaces of each piston are curved in cup-shaped manner with the outer edges pointing in the conveying direction of said piston chain.

* * * * *